United States Patent
Tajime et al.

(10) Patent No.: US 9,258,560 B2
(45) Date of Patent: Feb. 9, 2016

(54) VIDEO DECODING APPARATUS, VIDEO CODING APPARATUS, VIDEO DECODING METHOD, VIDEO CODING METHOD, AND PROGRAM

(75) Inventors: Junji Tajime, Tokyo (JP); Hirofumi Aoki, Tokyo (JP); Keiichi Chono, Tokyo (JP); Yuzo Senda, Tokyo (JP); Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 280 days.

(21) Appl. No.: 13/808,829

(22) PCT Filed: Jun. 21, 2011

(86) PCT No.: PCT/JP2011/064102
§ 371 (c)(1),
(2), (4) Date: Feb. 12, 2013

(87) PCT Pub. No.: WO2012/005106
PCT Pub. Date: Jan. 12, 2012

(65) Prior Publication Data
US 2013/0136177 A1    May 30, 2013

(30) Foreign Application Priority Data
Jul. 8, 2010   (JP) .................................. 2010-155601

(51) Int. Cl.
*H04N 11/02*        (2006.01)
*H04N 19/50*        (2014.01)
(Continued)

(52) U.S. Cl.
CPC ....... *H04N 19/00569* (2013.01); *H04N 19/426* (2014.11); *H04N 19/46* (2014.11); *H04N 19/593* (2014.11)

(58) Field of Classification Search
CPC ............ H04N 19/00569; H04N 19/46; H04N 19/593; H04N 19/426
See application file for complete search history.

(56) References Cited

U.S. PATENT DOCUMENTS 5,793,425 A * 8/1998 Balakrishnan ........... 375/240.25
6,097,843 A   8/2000 Takashima et al.
2007/0230572 A1* 10/2007 Koto et al. ............... 375/240.12

FOREIGN PATENT DOCUMENTS

JP   9-261635 A   10/1997
JP   10-271516 A  10/1998
(Continued)

OTHER PUBLICATIONS

"Information technology—Coding of audio-visual objects-, Part 10: Advanced Video Coding", ISO/IEC 14496-10, May 15, 2009, Fifth Edition, 694 pages.
(Continued)

*Primary Examiner* — Tat Chio
(74) *Attorney, Agent, or Firm* — Sughrue Mion, PLLC

(57) ABSTRACT

In the present invention, reconstructed images for prediction are stored in uncompressed reference picture memory and compressed reference picture memory. A video decoder stores in uncompressed reference picture memory a reconstructed image of a frame to be decoded which has been generated on the basis of a prediction, and among reconstructed images which have been stored in the uncompressed reference picture memory, compresses a reconstructed image that will not be used for prediction of the frame to be decoded and stores the image in the compressed reference picture memory. Using the reconstructed images which are stored in the uncompressed reference picture memory and the compressed reference picture memory, the video bitstream is decoded into a video.

16 Claims, 14 Drawing Sheets

(51) Int. Cl.
*H04N 19/46* (2014.01)
*H04N 19/593* (2014.01)
*H04N 19/426* (2014.01)

(56) References Cited

FOREIGN PATENT DOCUMENTS

| JP | 2003-348592 A | 12/2003 |
|---|---|---|
| JP | 3918263 B2 | 5/2007 |
| JP | 2007-166323 A | 6/2007 |
| JP | 3928815 B2 | 6/2007 |
| JP | 2007174602 A | 7/2007 |
| JP | 2007-266970 A | 10/2007 |
| JP | 2009260977 A | 11/2009 |
| JP | 4384130 B2 | 12/2009 |

OTHER PUBLICATIONS

Madhukar Budagavi, et al., "Video Coding Using Compressed Reference Frames", IEEE, ICASSP, 2008, pp. 1165-1168.
Communication dated Jun. 24, 2015, issued by the Japanese Patent Office in counterpart Application No. 2012-523809.

* cited by examiner

FIG. 4

```
mmsq_encode_block(x[N]) {
    // Calculate min and max value of pixels in x
    min = minimum(x);
    max = maximum(x);

// Quantize min and max values
    min >>= 8 - M;
    max >>= 8 - M;

//Store min and max values, M bits each
    putbits(min, M);
    putbits(max, M);

// Inverse-Quantize min and max values
    min <<= 8 - M;
    max = ((max + 1) << (8 - M)) - 1;

// Scalar quantize all pixels to L bits
    for (n=0 to N-1) {
        dq = floor((x[n]-min) * (2^L-1) / (max - min) + 0.5);
        putbits(dq, L);
    }
}
```

FIG. 9

| seq_parameter_set_data(){ | C | Descriptor |
|---|---|---|
| ... | | |
| mem_compression_flag | 0 | u(1) |
| if(mem_compression_flag) | 0 | |
| { | | |
| ... | | |
| num_comressed_ref_pic | 0 | Ue(v) |
| ... | | |
| } | | |
| ... | | |
| } | | |

FIG. 10

| seq_parameter_set_data(){ | C | Descriptor |
|---|---|---|
| ... | | |
| mem_compression_flag | 0 | u(1) |
| if(mem_compression_flag) | 0 | |
| { | | |
| ... | | |
| compression_ratio_num_minus1 | 0 | ue(v) |
| ... | | |
| for( i = 0; i < (compression_ratio_num_minus1+1); i++ ){ | | |
| if(i==0){ | | |
| num_uncompressed_ref_pic | 0 | ue(v) |
| } else { | | |
| num_uncompressed_ref_pic[i-1] | 0 | ue(v) |
| } | | |
| ... | | |
| } | | |
| ... | | |
| } | | |

VIDEO DECODING APPARATUS, VIDEO CODING APPARATUS, VIDEO DECODING METHOD, VIDEO CODING METHOD, AND PROGRAM

CROSS REFERENCE TO RELATED APPLICATIONS

This application is a National Stage of International Application No. PCT/JP2011/064102, filed on Jun. 21, 2011, which claims priority from Japanese Patent Application No. 2010-155601, filed on Jul. 8, 2010, the contents of all of which are incorporated herein by reference in their entirety.

TECHNICAL FIELD

The present invention relates to a video decoding apparatus, a video coding apparatus, a video decoding method, a video coding method, and a program.

BACKGROUND ART

There are video coding apparatuses for applying coding processing to frames of an input video in conformity with a certain video coding scheme to generate coded data, i.e., a video bitstream. There are also video decoding apparatuses for receiving such a video bitstream as an input to generate a decoded video.

An example of the video coding schemes is ISO/IEC 14496-10 AVC (Advanced Video Coding). In ISO/IEC 14496-10 AVC, each frame is divided into blocks each having a size of 16×16 pixels, the block being referred to as MB (Macro Block). An MB is further divided into blocks each having a size of 4×4 pixels, the 4×4 pixel block being defined as a minimal unit of coding. An example of block division is shown in FIG. 14, where the spatial resolution of a frame is in a QCIF (Quarter Common Intermediate Format) 4:2:0 format.

The divided blocks are coded based on prediction. Intra-frame prediction predicts an image using a reconstructed image of a current frame of interest for coding processing. Inter-frame prediction, or inter-layer prediction or inter-view prediction, predicts an image using a reconstructed image of a frame coded previous to a current frame of interest for coding processing. Moreover, to reduce compression distortion, in-loop filtering is applied to the reconstructed image of a frame of interest for coding processing. A video coding apparatus and a video decoding apparatus comprise a reference picture memory for storing frames including reconstructed images (reference pictures).

Regarding video decoding apparatuses for decoding a video bitstream output by a video coding apparatus to obtain a decoded video, Patent Documents 1-3, for example, disclose techniques of applying lossy compression to a reference picture in order to reduce the memory bandwidth and/or memory size in the video decoding apparatus, and storing a resulting picture in a reference picture memory.

CITATION LIST

Patent Literature

PTL 1: JP P4384130B
PTL 2: JP P3928815B
PTL 3: JP P3918263B

SUMMARY OF INVENTION

Technical Problem

The application of lossy compression to a reference picture in a video decoding apparatus as described above, however, brings about compression distortion, which poses a problem of degradation of image quality of a decoded video.

The present invention has been made in view of such a problem, and its object is to provide a video decoding apparatus, a video coding apparatus, a video decoding method, a video coding method, and a program that reduce degradation of image quality of a decoded video.

Solution to Problem

The present invention is a video decoding apparatus for decoding a video bitstream that is coded based on prediction into a video, said apparatus being characterized in comprising: first and second memories in which reconstructed images for use in prediction are stored; compressing means for compressing said reconstructed images; decompressing means for decompressing the compressed reconstructed images; and video decoding means for storing in said first memory a reconstructed image of a frame of interest for decoding generated based on prediction, storing in the second memory a reconstructed image of said reconstructed images stored in said first memory, which is not used in prediction of said frame of interest for decoding, after compressing it via said compressing means, and decoding said video bitstream into a video using the reconstructed image stored in said first memory and the reconstructed image decompressed via said decompressing means.

The present invention is a video decoding apparatus for decoding a video bitstream that is coded based on prediction into a video, said apparatus being characterized in comprising: first and second memories in which reconstructed images for use in prediction are stored; compressing means for compressing said reconstructed images; decompressing means for decompressing the compressed reconstructed images; and video decoding means for storing in said first memory a reconstructed image of a frame of interest for decoding generated based on prediction, storing in the second memory the reconstructed image of said frame of interest for decoding after compressing it via said compressing means, and decoding said video bitstream into a video using the reconstructed image stored in said first memory and the reconstructed image decompressed via said decompressing means.

The present invention is a video decoding apparatus for decoding a video bitstream that is coded based on prediction into a video, said apparatus being characterized in comprising: first and second memories in which reconstructed images for use in prediction are stored; first and second compressing means for compressing said reconstructed images; first decompressing means for decompressing the reconstructed image compressed by said first compressing means; second decompressing means for decompressing the reconstructed image compressed by said second compressing means; and video decoding means for storing in said first memory a reconstructed image of a frame of interest for decoding generated based on prediction after compressing it via said first compressing means, decompressing a reconstructed image of said reconstructed images stored in said first memory, which is not used in prediction of said frame of interest for decoding, via said first decompressing means, storing in the second memory said decompressed reconstructed image after compressing it via said second compressing means, and decoding said video bitstream into a video using the reconstructed image stored in said first memory after being decompressed and the reconstructed image stored in said second memory after being decompressed.

The present invention is a video coding apparatus for coding an input video into a video bitstream based on prediction, said apparatus being characterized in comprising: first and second memories in which reconstructed images for use in prediction are stored; compressing means for compressing said reconstructed images; decompressing means for decompressing the compressed reconstructed images; video coding means for storing in said first memory a reconstructed image of a frame of interest for coding generated based on prediction, storing in the second memory a reconstructed image of said reconstructed images stored in said first memory, which is not used in prediction of said frame of interest for decoding, after compressing it via said compressing means, and coding an input video into a video bitstream using the reconstructed image stored in said first memory and the reconstructed image decompressed via said decompressing means; compression/decompression control means for controlling said compressing means and said decompressing means; and multiplexing means for multiplexing said video bitstream with operation parameters for said compression/decompression control means, and outputting a bitstream.

The present invention is a video decoding method characterized in comprising: storing in a first memory reconstructed images of a frame of interest for decoding generated based on prediction; storing in a second memory a reconstructed image of said reconstructed images stored in said first memory, which is not used in prediction of said frame of interest for decoding, after compressing it; and decoding said video bitstream into a video using the reconstructed image stored in said first memory and the reconstructed image stored in said second memory after being decompressed.

The present invention is a video coding method characterized in comprising: storing in a first memory reconstructed images of a frame of interest for coding generated based on prediction; storing in a second memory a reconstructed image of said reconstructed images stored in said first memory, which is not used in prediction of said frame of interest for decoding, after compressing it; coding an input video into a video bitstream using the reconstructed image stored in said first memory and the reconstructed image stored in said second memory after being decompressed; controlling compression/decompression of said reconstructed images; and multiplexing said video bitstream with operation parameters regarding control of compression/decompression of said reconstructed images, and outputting a bitstream.

The present invention is a program causing a computer to execute the processing of: storing in a first memory reconstructed images of a frame of interest for decoding generated based on prediction; storing in a second memory a reconstructed image of said reconstructed images stored in said first memory, which is not used in prediction of said frame of interest for decoding, after compressing it; and decoding said video bitstream into a video using the reconstructed image stored in said first memory and the reconstructed image stored in said second memory after being decompressed.

The present invention is a program causing a computer to execute the processing of: storing in a first memory reconstructed images of a frame of interest for coding generated based on prediction; storing in a second memory a reconstructed image of said reconstructed images stored in said first memory, which is not used in prediction of said frame of interest for decoding, after compressing it; coding an input video into a video bitstream using the reconstructed image stored in said first memory and the reconstructed image stored in said second memory after being decompressed; controlling compression/decompression of said reconstructed images; and multiplexing said video bitstream with operation parameters regarding control of compression/decompression of said reconstructed images, and outputting a bitstream.

Advantageous Effects of Invention

According to the present invention, degradation of image quality of a decoded video can be reduced.

BRIEF DESCRIPTION OF DRAWINGS

FIG. 4 is a diagram showing a pseudo-code of MMSQ-based coding.

FIG. 9 is a diagram showing an example of multiplexing of auxiliary information with sequence parameters.

FIG. 10 is a diagram showing an example of multiplexing of auxiliary information with sequence parameters.

DESCRIPTION OF EMBODIMENTS

Now several embodiments of the present invention will be described with reference to the accompanying drawings.

<First Embodiment>

Figure 1:
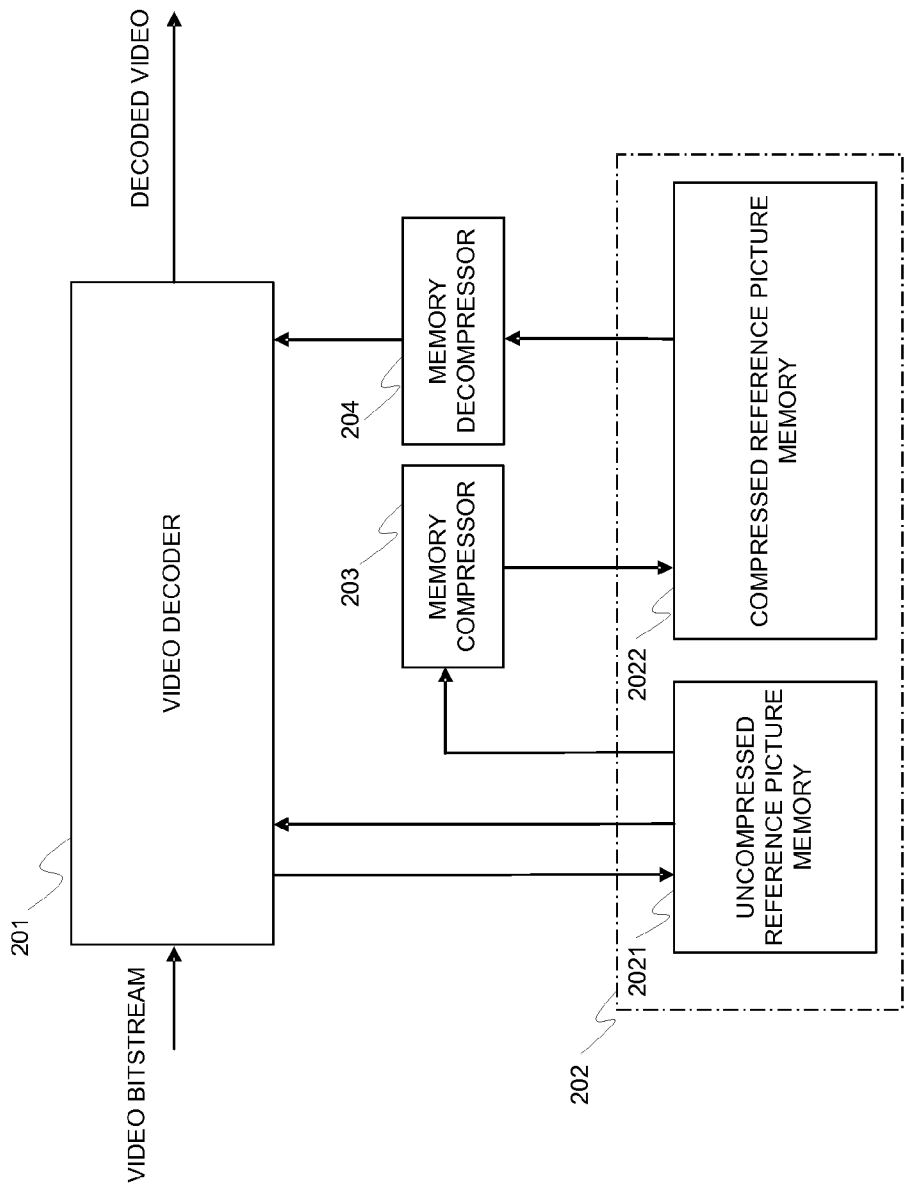
FIG. 1 is a block diagram of a video decoding apparatus in accordance with a first embodiment of the present invention.

FIG. 1 is a block diagram of a video decoding apparatus in accordance with a first embodiment of the present invention. As shown, the video decoding apparatus in accordance with the first embodiment comprises a video decoder 201, a reference picture memory 202, a memory compressor 203, and a memory decompressor 204. The reference picture memory 202 is a memory in which reconstructed images for use in prediction are stored, and it comprises an uncompressed reference picture memory 2021 and a compressed reference picture memory 2022.

The video decoder 201 receives a video bitstream and a reconstructed image to be referred to in decoding as inputs, and outputs a decoded video.

When referring to a reconstructed image of a frame of interest for decoding in decoding the frame of interest for decoding, that is, when performing intra-frame prediction, compression distortion reduction processing, and the like, the video decoder 201 reads the reconstructed image from the uncompressed reference picture memory 2021. When referring to a reconstructed image of a frame other than the frame of interest for decoding in decoding the frame of interest for decoding, that is, when performing inter-frame prediction, inter-layer prediction, inter-view prediction, or the like, the video decoder 201 reads the reconstructed image from the compressed reference picture memory 2022 via the memory decompressor 204.

The video decoder 201 stores in the uncompressed reference picture memory 2021 a reconstructed image of a frame of interest for decoding that may be possibly referred to in decoding the frame of interest for decoding. Moreover, the video decoder 201 reads a reconstructed image of a frame of interest for decoding that is no longer referred to in decoding the frame of interest for decoding (that is not used in prediction) from the uncompressed reference picture memory 2021, and stores it in the compressed reference picture memory 2022 via the memory compressor 203 as compressed data.

The memory compressor 203 applies lossy compression to an image read and supplied from the uncompressed reference picture memory 2021 to generate compressed data, and stores the compressed data in the compressed reference picture memory 2022.

The memory decompressor 204 decompresses compressed data stored in the compressed reference picture memory 2022, the data including a reconstructed image requested by the video decoder 201.

Now video decoding processing by the video decoding apparatus in accordance with the first embodiment of the present invention will be described with reference to FIG. 2.

The video decoder 201 decides whether to refer to a reconstructed image in prediction in decoding a frame of interest for decoding (Step S101).

In a case that it is decided to refer to a reconstructed image (Step S101: YES), the video decoder 201 decides whether to refer to a reconstructed image of the frame of interest for decoding (whether to use it in prediction) (Step S102).

In a case that it is decided to refer to a reconstructed image of the frame of interest for decoding (Step S102: YES), the video decoder 201 reads a reconstructed image to be referred to from the uncompressed reference picture memory 2021 (Step S104).

Alternatively, in a case that it is decided not to refer to a reconstructed image of the frame of interest for decoding (Step S102: NO), the video decoder 201 reads a reconstructed image to be referred to from the compressed reference picture memory 2022 via the memory decompressor 204 (Step S103).

The video decoder 201 receives a video bitstream and a reconstructed image as inputs, applies decoding processing thereto, and outputs a decoded image (Step S105).

The video decoder 201 stores a reconstructed image of the frame of interest for decoding that may be possibly referred to in the uncompressed reference picture memory 2021 as a reference picture (Step S106).

The video decoder 201 decides whether any reconstructed image of the frame of interest for decoding that is no longer referred to in decoding the frame of interest for decoding is present in the uncompressed reference picture memory 2021 (Step S107).

In a case that there is a reconstructed image of the frame of interest for decoding that is no longer referred to in decoding the frame of interest for decoding (Step S107: YES), the video decoder 201 reads the reconstructed image from the uncompressed reference picture memory 2021, and stores it in the compressed reference picture memory 2022 via the memory compressor 203 as compressed data (Step S108).

Alternatively, in a case that it is decided at Step S107 that there is no appropriate reconstructed image (Step S107: NO), or after compressed data has been stored in the compressed reference picture memory 2022 at Step S108, the video decoder 201 decides whether the decoded video bitstream is of a last frame in video decoding (Step S109). In a case that it is decided that the video bitstream is of a last frame (Step S109: YES), video decoding is terminated. Alternatively, in a case that it is decided that the video bitstream is not of a last frame (Step S109: NO), the flow goes back to Step S101.

As described above, according to the video decoding apparatus in accordance with the first embodiment, degradation of image quality of a decoded image can be reduced. A reason thereof is that a reconstructed image of a frame of interest for decoding that may be possibly referred to in decoding the frame of interest for decoding is stored in the uncompressed reference picture memory 2021 without being compressed so that an uncompressed reconstructed image is used in prediction, whereby compression distortion of the frame of interest for decoding can be reduced.

While the video decoder 201 controls storage of a reference picture in the reference picture memory 202 and/or readout thereof using information about a decoded video bitstream in the present embodiment, the present invention is not limited thereto, and there may be additionally provided therein a reference picture memory controller, for example, for controlling storage of a reference picture in the reference picture memory 202 and/or readout thereof using information about a decoded video bitstream.

In that case, when referring to a reconstructed image of a frame of interest for decoding in decoding the frame of interest for decoding at the video decoder 201, that is, when applying intra-frame prediction, compression distortion reduction processing, and the like, the reference picture memory controller makes control to supply the reconstructed image to be referred to from the uncompressed reference picture memory 2021 to the video decoder 201. When referring to a reconstructed image of a frame other than the frame of interest for decoding, that is, when applying inter-frame prediction, inter-layer prediction, inter-view prediction, or the like, the reference picture memory controller makes control to supply the reconstructed image to be referred to from the compressed reference picture memory 2022 to the video decoder 201 via the memory decompressor 204.

Moreover, the reference picture memory controller makes control to store a reconstructed image of a frame of interest for decoding that is decoded at the video decoder 201 and that may be possibly referred to in the uncompressed reference picture memory 2021 as a reference picture. The reference picture memory controller makes control to read a reconstructed image of a frame of interest for decoding that is no longer referred to in decoding the frame of interest for decoding at the video decoder 201 from the uncompressed reference picture memory 2021, and store it in the compressed reference picture memory 2022 via the memory compressor 203 as compressed data.

Now a specific exemplary embodiment of the video decoding apparatus in accordance with the first embodiment above will be described hereinbelow.

Figure 3:
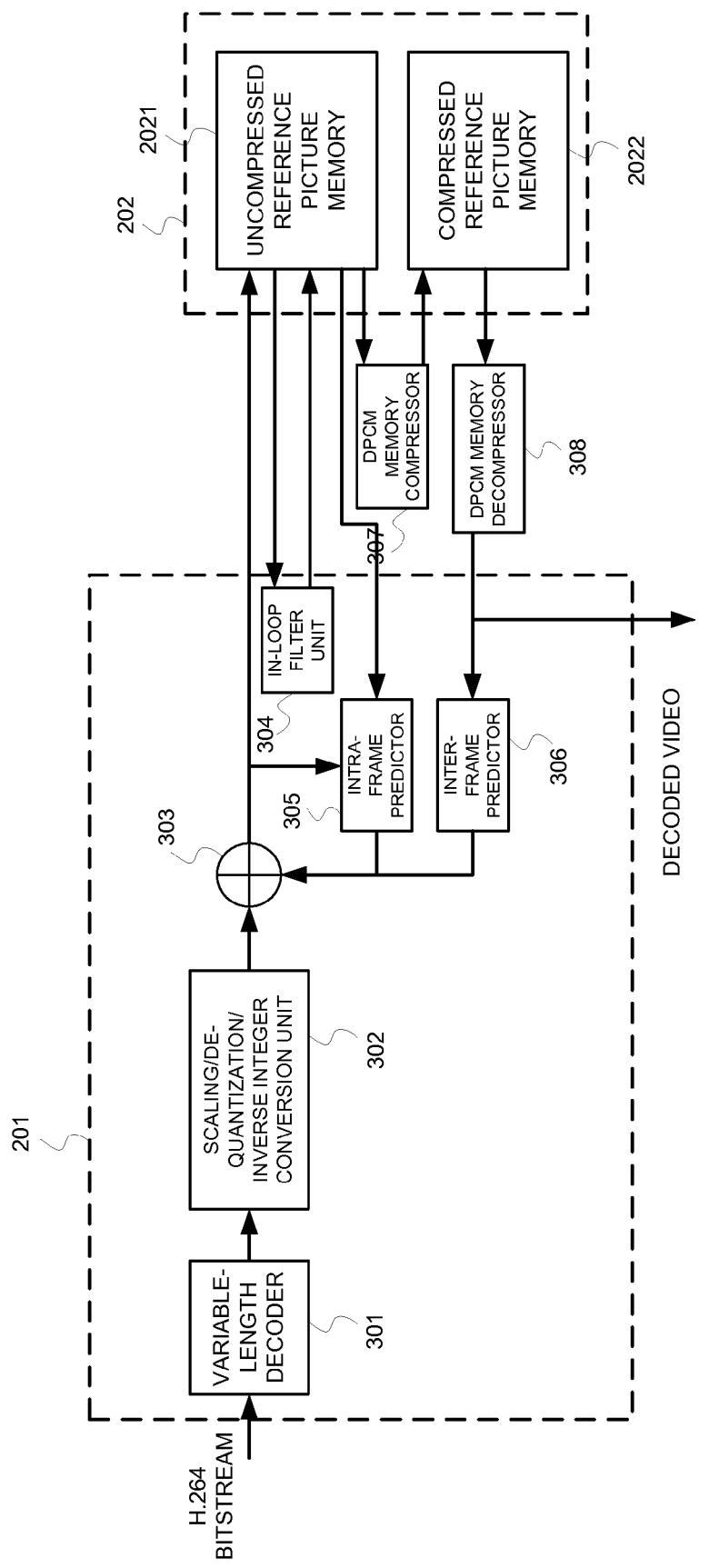
FIG. 3 is a diagram illustrating a configuration of the video decoding apparatus in accordance with an exemplary embodiment of the first embodiment.

FIG. 3 exemplarily shows a configuration of a video decoding apparatus in accordance with the present exemplary embodiment. As shown, the video decoder 201 in the present exemplary embodiment comprises a variable-length decoder 301, a scaling/de-quantization/inverse integer conversion unit 302, an adder 303, an in-loop filter unit 304, an intra-frame predictor 305, and an inter-frame predictor 306.

Moreover, it is assumed in the present exemplary embodiment that the video coding scheme is based on ISO/IEC14496-10 AVC (Advanced Video Coding), and the memory compressor 203 and memory decompressor 204 support differential pulse-code modulation (DPCM: a DPCM memory compressor 307 and a DPCM memory decompressor 308) having a processing cycle of N pixels and a prediction error coded in M bits.

The video decoder 201 receives an H.264 bitstream and a reconstructed image to be referred to in decoding as inputs, and outputs a decoded video.

In a case that intra-frame prediction is applied in decoding an MB (Macro Block) of interest for decoding, the intra-frame predictor 305 reads a reconstructed image to be referred to from the uncompressed reference picture memory 2021. Alternatively, in a case that inter-frame prediction is applied, the inter-frame predictor 306 reads a reconstructed image to be referred to from the compressed reference picture memory 2022 via the DPCM memory decompressor 308.

The adder 303 adds a differential signal decoded via the variable-length decoder 301 and scaling/de-quantization/inverse integer conversion unit 302 with the reconstructed image to be referred to decode an image of the MB of interest.

The video decoder 201 stores the decoded image of the MB of interest in the uncompressed reference picture memory 2021 as a reference picture.

The in-loop filter unit 304 reads a reconstructed image to be referred to from the compressed reference picture memory 2021 after processing except in-loop filtering is completed for decoding a frame of interest for decoding, applies in-loop filtering on an MB-by-MB basis in a raster-scan order, and stores a result in the uncompressed reference picture memory 2021.

The video decoder 201 reads a reconstructed image that is not referred to in the in-loop filter unit 304 from the uncompressed reference picture memory 2021, and stores the image in the compressed reference picture memory 2022 via the DPCM memory compressor 307 as compressed data.

It should be noted that in a case that a frame of interest for decoding is coded in a raster-scan order, in-loop filtering may be applied on an MB-by-MB basis. In that case, the size of the uncompressed reference picture memory 2021 may be reduced to a value smaller than the size of one frame. In particular, in a case that decoding is performed on an MB-by-MB basis in a raster-scan order, only a reconstructed image to be referred to in intra-prediction and in-loop filtering may be stored.

Now an operation of the DPCM memory compressor 307 and DPCM memory decompressor 308 will be described hereinbelow.

Representing a pixel value x(n) in an input image within a processing cycle as x(n)=0, 1, . . . , N−1, a compressed output signal y(n) is determined as given by EQ. (1):

[Equation 1]

$$y(n) = \begin{cases} x(n); & n = 0 \\ epqridx(n); & n \neq 0 \end{cases} \quad \text{(EQ. (1))}$$

A pixel value x(0) at a left end of a block is coded based on PCM as a reference pixel for prediction, that is, the input pixel value is retained. Other values have a fixed-length index value epqridx(n) of an array of representative values of quantization for a quantization representative value epqr(n). Epqridx(n) is determined using EQs. (2), (3), (4), and (5).

[Equation 2]

$$epqridx(n) = \mathrm{argmin}_{i=0 \ldots 2^M-1}[|epqr(i) - ep(n)|] \quad \text{(EQ. (2))}$$

[Equation 3]

$$ep(n) = x(n) - xp(n) \quad \text{(EQ. (3))}$$

[Equation 4]

$$xp(n) = xr(n-1) \quad \text{(EQ. (4))}$$

[Equation 5]

$$xr(n) = xp(n) + epqr(epqridx(n)) \quad \text{(EQ. (5))}$$

In these equations, ep(n) denotes a prediction error, xp(n) denotes a predicted pixel value, and xr(n) denotes a decoded pixel value.

Decompression of an output signal x(n)' is determined as given by EQ. (6):

[Equation 6]

$$x(n)' = \begin{cases} y(n); & n = 0 \\ x(n-1)' + epqr(epqridx(n)); & n \neq 0 \end{cases} \quad \text{(EQ. (6))}$$

While DPCM is applied in memory compression and decompression in the present exemplary embodiment, the present invention is not limited thereto, and another scheme may be employed. For example, a min/max scalar quantization (MMSQ) scheme described in "VIDEO CODING USING COMPRESSED REFERENCE FRAMES" by M. Budagavi and M. Zhou, ICASSP'2008, pp. 1165-1168 (2008) may be employed. A pseudo-code of the MMSQ-based coding is shown in FIG. 4. It is assumed here that an input video is expressed in eight bits. A maximum pixel value max within a processing cycle and a minimum pixel value min within a processing cycle are expressed in M bits. Moreover, the processing cycle is N pixels. The MMSQ scheme applies linear quantization to an error between a pixel value x[n] and a minimum pixel value within a processing cycle. A quantization parameter qp for use in quantization is determined as given by EQ. (7):

[Equation 7]

$$qp = (\max - \min)/(2^L - 1) \quad \text{(EQ. (7))}$$

In this equation, L is a parameter of the number of the representative values of quantization.

<Second Embodiment>

Next, a video decoding apparatus in accordance with a second embodiment of the present invention will be described. For the present embodiment, only differences from the first embodiment will be addressed.

Figure 5:
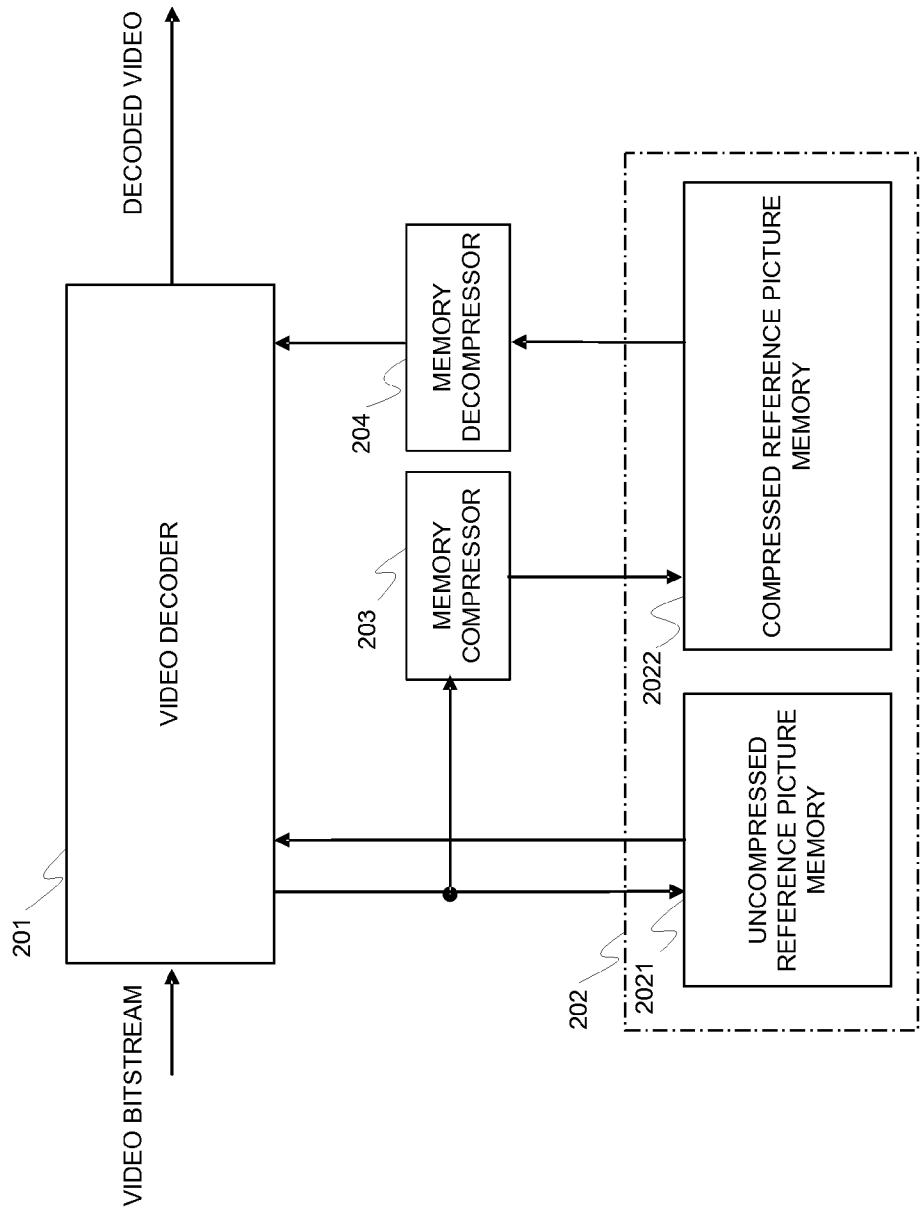
FIG. 5 is a block diagram of a video decoding apparatus in accordance with a second embodiment of the present invention.

FIG. 5 is a block diagram of a video decoding apparatus in accordance with the second embodiment of the present invention. The memory compressor 203 applies lossy compression to an image supplied from the video decoder 201 to generate compressed data.

Figure 2:
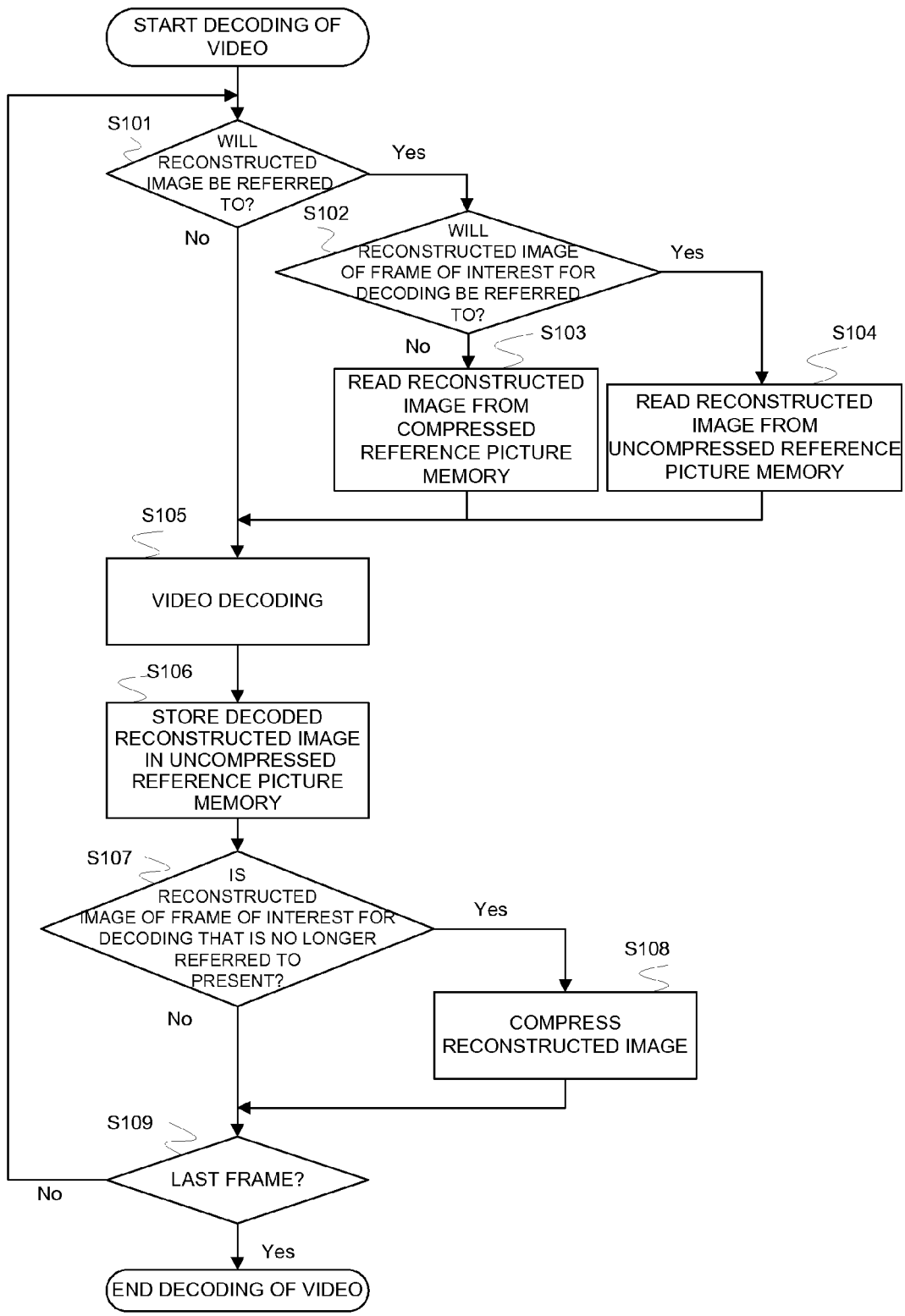
FIG. 2 is a flow chart for explaining video decoding processing by the video decoding apparatus in the first embodiment.

An operation of processing by the video decoding apparatus in accordance with the second embodiment is different from that of the video decoding apparatus in the first embodiment shown in the flow chart in FIG. 2 in Steps S106 and S108.

At Step S106, the video decoder 201 stores a reconstructed image of a frame of interest for decoding that may be possibly referred to in the uncompressed reference picture memory 2021 as a reference picture, applies lossy compression to the reconstructed image via the memory compressor 203, and stores compressed data in the compressed reference picture memory 2022. Then, at Step S108, no compression processing is performed and the process goes to Step S109.

As described above, according to the video decoding apparatus in accordance with the second embodiment, degradation of image quality of a decoded image can be reduced, and the time of the processing of lossy compression can be reduced. A reason thereof is that a reconstructed image of a frame of interest for decoding that may be possibly referred to in decoding the frame of interest for decoding is stored in the uncompressed reference picture memory 2021 and compressed reference picture memory 2022 at the same time.

<Third Embodiment>

Next, a video decoding apparatus in accordance with a third embodiment of the present invention will be described. For the present embodiment, only differences from the first embodiment will be addressed.

Figure 6:
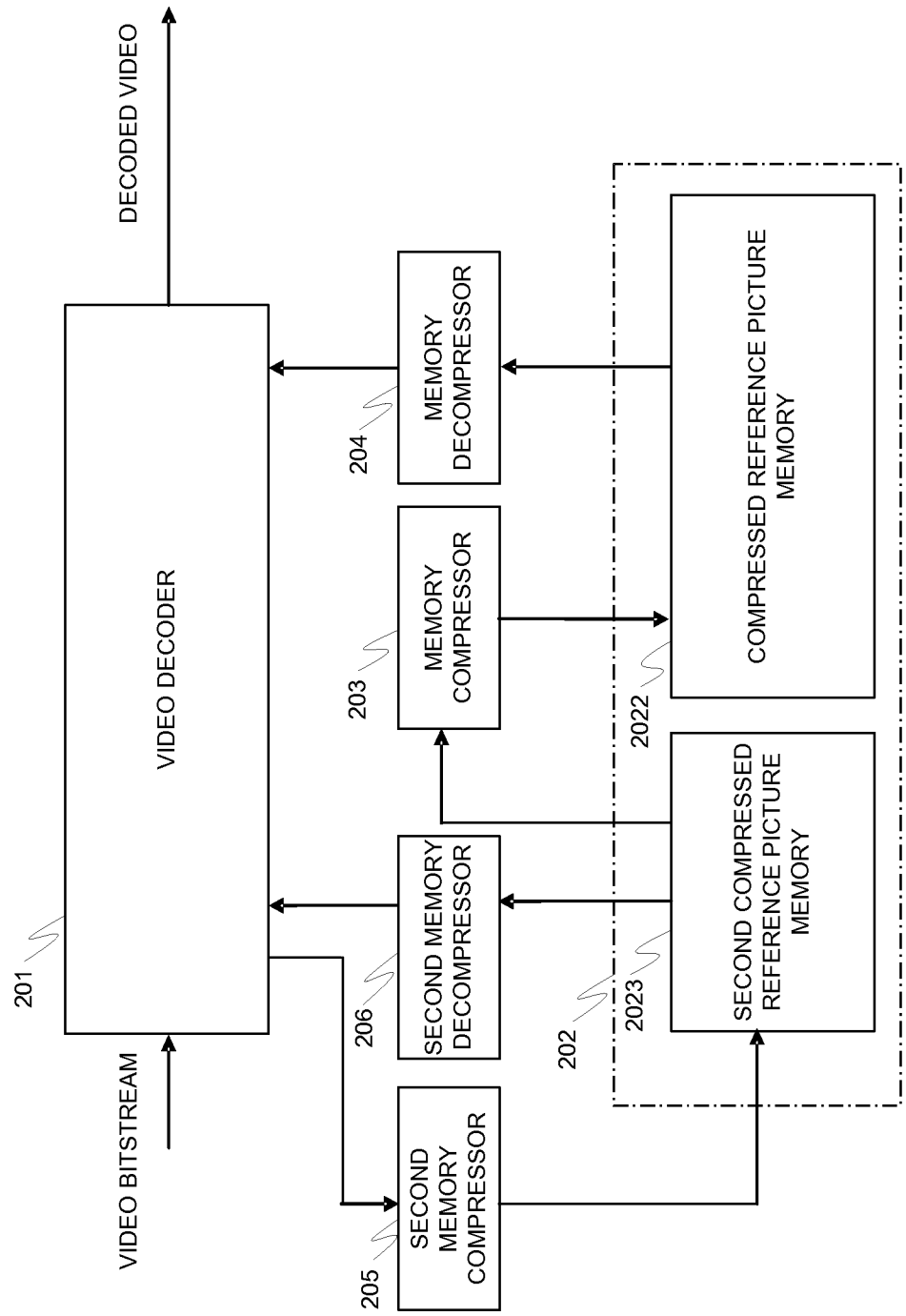
FIG. 6 is a block diagram of a video decoding apparatus in accordance with a third embodiment of the present invention.

FIG. 6 is a block diagram of a video decoding apparatus in accordance with the third embodiment of the present invention. The video decoding apparatus in accordance with the third embodiment additionally comprises a second memory compressor 205 and a second memory decompressor 206. It also comprises a second compressed reference picture memory 2023 in place of the uncompressed reference picture memory 2021.

The second memory compressor 205 applies compression to an image supplied from the video decoder 201 according to a coding scheme with a lower compression rate or higher efficiency than that of the memory compressor 203 to generate compressed data, and stores the compressed data in the second compressed reference picture memory 2023.

The second memory decompressor 206 decompresses compressed data stored in the second compressed reference picture memory 2023, the data including a reconstructed image requested by the video decoder 201.

An operation of processing by the video decoding apparatus in accordance with the third embodiment is different from that of the video decoding apparatus in the first embodiment shown in the flow chart in FIG. 2 in Steps S104, S106 and S108.

At Step S104, the video decoder 201 reads compressed data including a reconstructed image to be referred to from the second compressed reference picture memory 2023 via the second memory decompressor 206 and decompresses it.

At Step S106, the video decoder 201 applies compression to a reconstructed image of a frame of interest for decoding that may be possibly referred to via the second memory compressor 205, and stores the compressed data in the second compressed reference picture memory 2023 as a reference picture.

At Step S108, the video decoder 201 decompresses compressed data stored in the second compressed reference picture memory 2023 via the second memory decompressor 206, the data including a reconstructed image that is no longer referred to. It then stores the decompressed reconstructed image in the compressed reference picture memory 2022 via the memory compressor 203 as compressed data.

As described above, according to the video decoding apparatus in accordance with the third embodiment, degradation of image quality of a decoded image can be reduced, and the memory size of the second compressed reference picture memory 2023 can be reduced. A reason thereof is that, for an image supplied from the video decoder 201, compression is applied to a reconstructed image of a frame of interest for decoding that may be possibly referred to in decoding the frame of interest for decoding according to a coding scheme with a lower compression rate or higher efficiency, and the resulting image is stored in the second compressed reference picture memory 2023.

<Fourth Embodiment>

Figure 7:
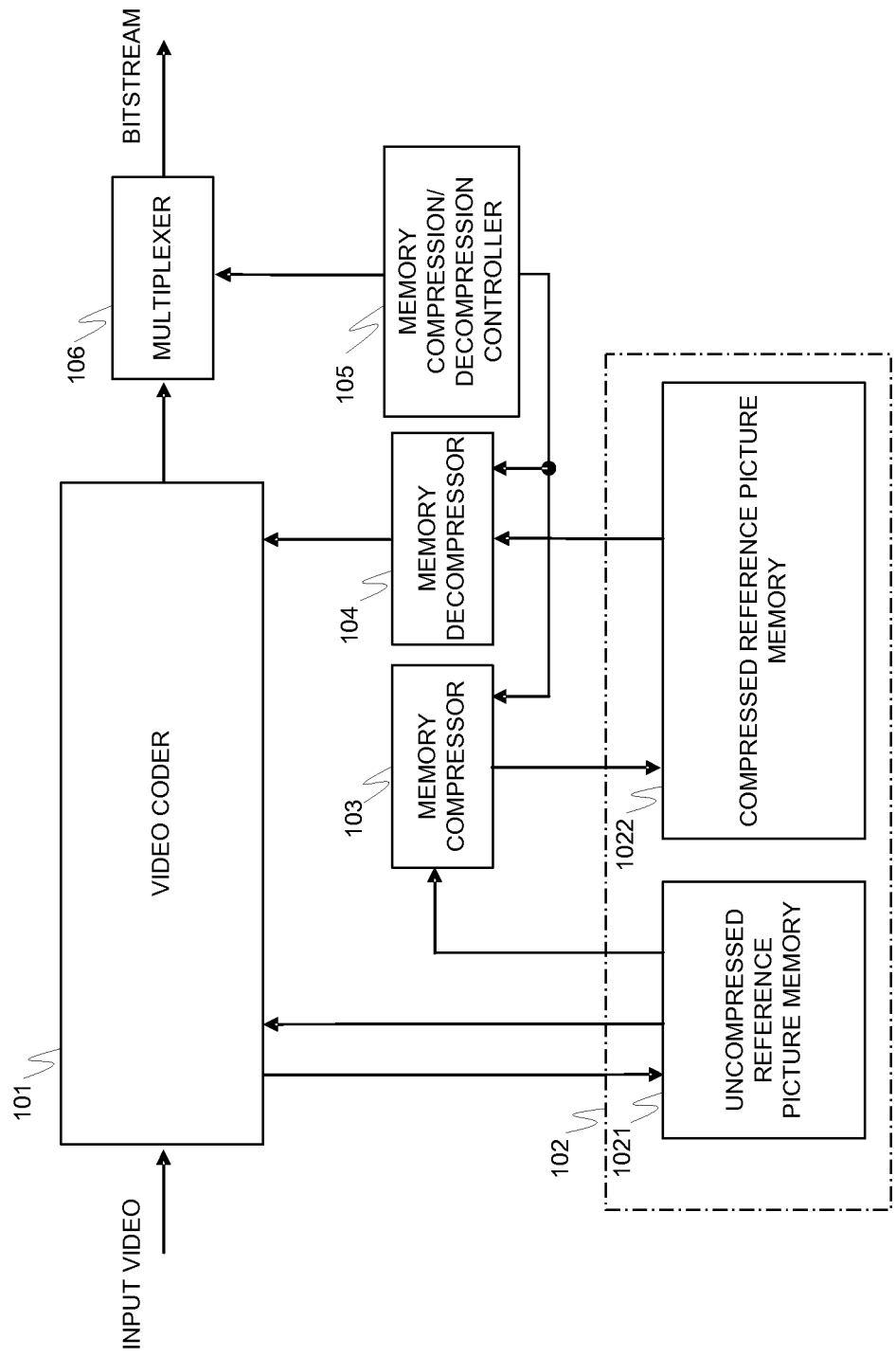
FIG. 7 is a block diagram of a video coding apparatus in accordance with a fourth embodiment of the present invention.

FIG. 7 is a block diagram of a video coding apparatus in accordance with a fourth embodiment of the present invention. As shown, the video coding apparatus in accordance with the fourth embodiment comprises a video coder 101, a reference picture memory 102, a memory compressor 103, a memory decompressor 104, a memory compression/decompression controller 105, and a multiplexer 106. The reference picture memory 102 comprises an uncompressed reference picture memory 1021 and a compressed reference picture memory 1022.

The video coder 101 codes each frame using an input video and a reconstructed image to be referred to in coding, and supplies a resulting video bitstream to the multiplexer 106.

When referring to a reconstructed image of a frame of interest for coding in coding a frame of interest for coding, the video coder 101 reads the reconstructed image from the uncompressed reference picture memory 1021. Alternatively, when referring to a reconstructed image of a frame other than the frame of interest for coding, it reads the reconstructed image from the compressed reference picture memory 1022 via the memory decompressor 104.

The video coder 101 stores a reconstructed image of a frame of interest for coding that may be possibly referred to in the uncompressed reference picture memory 1021. Moreover, the video coder 101 reads a reconstructed image of a frame of interest for coding that is no longer referred to in coding a frame of interest for coding from the uncompressed reference picture memory 1021, and stores it in the compressed reference picture memory 1022 via the memory compressor 103 as compressed data.

The memory compressor 103 applies lossy compression to an image supplied from the uncompressed reference picture memory 1021 to generate compressed data, and stores the compressed data in the compressed reference picture memory 1022.

The memory decompressor 104 decompresses the compressed data stored in the compressed reference picture memory 1022, the data including a reconstructed image requested by the video coder 101.

The memory compression/decompression controller 105 signals auxiliary information required in compression and decompression to the memory compressor 103 and memory decompressor 104. The memory compression/decompression controller 105 supplies the auxiliary information required in compression and decompression to the multiplexer 106 so that the same reference picture as that in the video coding apparatus can be obtained in the video decoding apparatus.

The multiplexer 106 multiplexes a video bitstream with auxiliary information, and outputs a bitstream.

Figure 8:
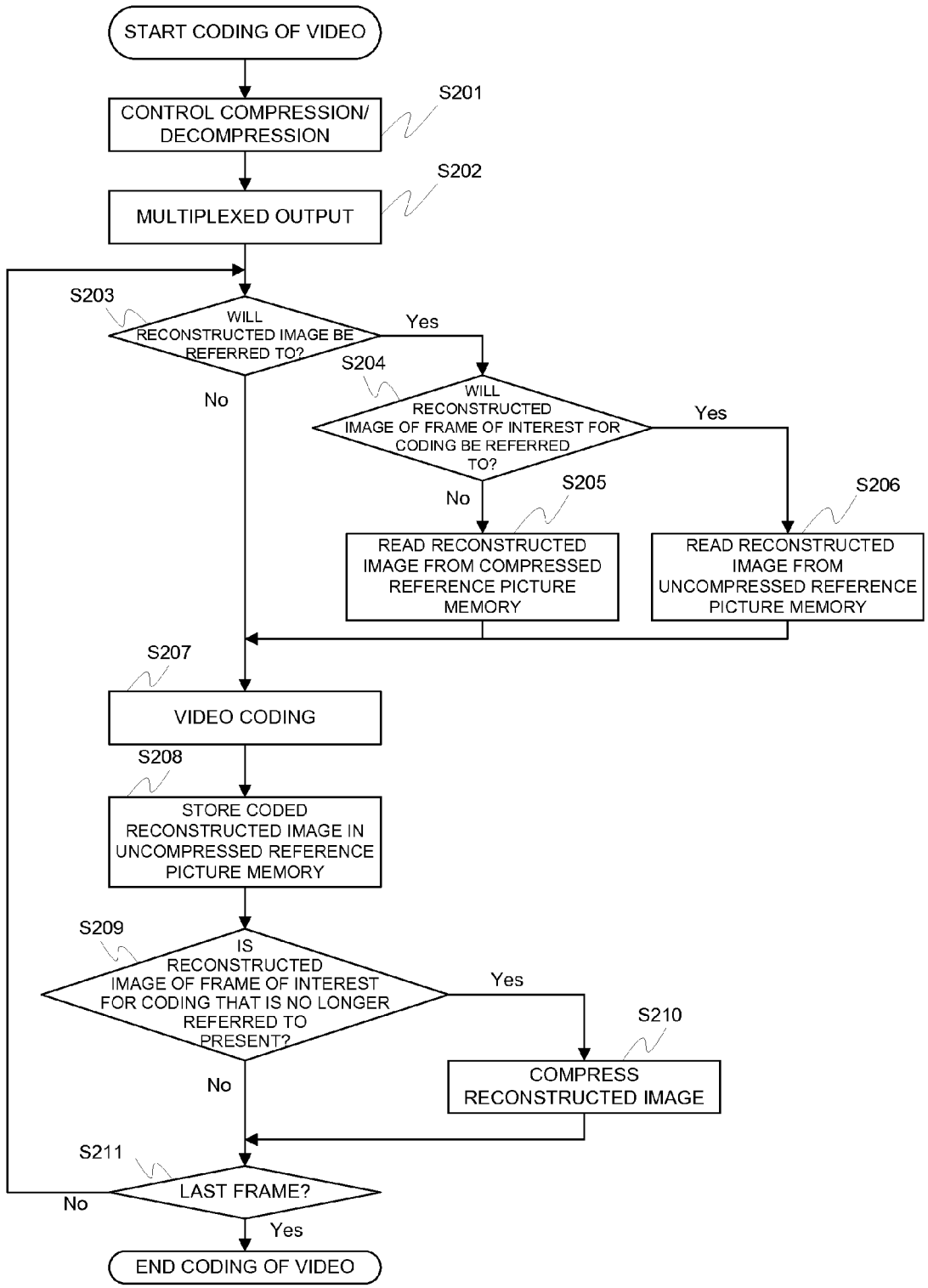
FIG. 8 is a flow chart for explaining video coding processing by the video coding apparatus in the fourth embodiment.

Now video coding processing by the video coding apparatus in accordance with the fourth embodiment of the present invention will be described with reference to FIG. 8. Here, memory compression/decompression control and multiplexing of auxiliary information required in compression and decompression are performed only once in coding processing. The processing, however, may be performed on a frame-by-frame basis or a several frames-by-frames basis.

The memory compression/decompression controller 105 signals auxiliary information required in compression and decompression to the memory compressor 103 and memory decompressor 104 (Step S201). The memory compression/decompression controller 105 also supplies the auxiliary information required in compression and decompression to the multiplexer 106 so that the same reference picture as that in the video coding apparatus can be obtained in the video decoding apparatus.

The multiplexer 106 multiplexes the video bitstream with the auxiliary information, and outputs a bitstream (Step S202).

The video coder 101 decides whether to refer to a reconstructed image in coding a frame of interest for coding (Step S203).

In a case that it is decided to refer to a reconstructed image (Step S203: YES), the video coder 101 decides whether to refer to a reconstructed image of the frame of interest for coding (Step S204).

In a case that it is decided to refer to a reconstructed image of the frame of interest for coding (Step S204: YES), the video coder 101 reads a reconstructed image to be referred to from the uncompressed reference picture memory 1021 (Step S206).

Alternatively, in a case that it is decided not to refer to a reconstructed image of the frame of interest for coding (Step S204: NO), the video coder 101 reads a reconstructed image to be referred to from the compressed reference picture memory 1022 via the memory decompressor 104 (Step S205).

The video coder 101 receives an input video and the reconstructed image as inputs, performs coding processing, and outputs a video bitstream (Step S207).

The video coder 101 stores a reconstructed image of the frame of interest for coding that may be possibly referred to in the uncompressed reference picture memory 1021 as a reference picture (Step S208).

The video coder 101 decides whether any reconstructed image of the frame of interest for coding that is no longer referred to in coding the frame of interest for coding is present (Step S209).

In a case that there is a reconstructed image of the frame of interest for coding that is no longer referred to in coding the frame of interest for coding (Step S209: YES), the video coder 101 reads the reconstructed image from the uncompressed reference picture memory 1021, and stores it in the compressed reference picture memory 1022 via the memory compressor 103 as compressed data (Step S210).

In a case that it is decided at Step S209 that there is no appropriate reconstructed image (Step S209: NO), or after compressed data has been stored in the compressed reference picture memory 1022 at Step S210, the video coder 101 decides whether the coded video bitstream is of a last frame in video coding (Step S211). In a case that it is decided that the bitstream is of a last frame (Step S211: YES), video coding is terminated. Alternatively, in a case that it is decided that the bitstream is not of a last frame (Step S211: NO), the flow goes back to Step S203.

While the video coder 101 control storage of a reference picture in the reference picture memory 102 and/or readout control thereof using information on coding such as the position of a block of interest for processing, processing of interest, and a prediction method in this embodiment, the present invention is not limited thereto, and there may be additionally provided therein a reference picture memory controller, for example, for controlling storage of a reference picture in the reference picture memory 102 and/or readout thereof as in the first embodiment. Moreover, the memory compression/decompression controller 105 may make control similar to that by the reference picture memory controller.

Now a specific exemplary example of the video coding apparatus in accordance with the fourth embodiment above will be described hereinbelow.

It is assumed in the present exemplary embodiment that the memory compressor 103 and memory decompressor 104 support differential pulse-code modulation (DPCM: Differential Pulse-Code Modulation) having a processing cycle of N pixels and a prediction error coded in M bits.

The memory compression/decompression controller 105 signals auxiliary information required in DPCM compression and decompression to the memory compressor 103 and memory decompressor 104.

The memory compression/decompression controller 105 supplies the auxiliary information required in DPCM compression and decompression to the multiplexer 106 so that the same reference picture as that in the video coding apparatus can be obtained in the video decoding apparatus.

As used herein, the auxiliary information includes, for example, a flag for deciding whether to apply compression/decompression processing, the number of reference pictures in the compressed reference picture memory, the number of reference pictures in the uncompressed reference picture memory, the size of the uncompressed reference picture memory, the size of the compressed reference picture memory, the processing cycle N in DPCM compression, the number M of bits for coding a prediction error, arrays of representative values of quantization, and the number of arrays of representative values of quantization. The auxiliary information may be provided as one set of such information, or several sets of such information for use with luma signals and chroma signals. Moreover, the auxiliary information may be provided on a video sequence-by-sequence basis or a frame-by-frame basis. Furthermore, all or part of the auxiliary information may be defined as fixed values common to the video coding apparatus and video decoding apparatus.

Now consider a case, for example, in which pieces of the auxiliary information including a flag mem_compression_flag for deciding whether to apply compression/decompression processing for each video sequence, and the number num_compressed_ref_pic of reference pictures in the compressed reference picture memory are multiplexed. In conformity with the description in ISO/IEC 14496-10 AVC, "Specification of syntax functions, categories, and descriptors," the auxiliary information may be multiplexed with the sequence parameters as exemplarily shown in a list in FIG. 9. It is assumed here that the total size MemSize of the reference picture memory, the memory size UCMemSizePerPic of an uncompressed reference picture, and the compression rate CR of the compressor are uniquely determined by the sequence parameters.

In a case that the number of reference pictures in the compressed reference picture memory is multiplexed, the number num_uncompressed_ref_pic of reference pictures in the uncompressed reference picture memory can be determined as given by EQ. (8):

[Equation 8]

$$\text{num\_uncompressed\_ref\_pic} = (\text{MemSize} - \text{UCMemSizePerPic} \times \text{CR} \times \text{num\_compressed\_ref\_pic}) / \text{UCMemSizePerPic} \quad (\text{EQ. (8)})$$

Thus, the decoding apparatus can fix memory allocation before starting decoding. While the number of reference pictures in the compressed reference picture memory is multiplexed in this example, the number num_uncompressed_ref_pic of reference pictures in the uncompressed reference picture memory may be multiplexed. Moreover, while the number of reference pictures is multiplexed in this example, the number of MBs, the number of pixels, the memory size, etc. of the uncompressed picture memory may be multiplexed for the reference picture memory size. For example, in a case that the number of MBs is specified, the number of MB images decoded lately and including an MB of interest may be accumulated as uncompressed images. Besides, the MB address for the uncompressed MB to be accumulated may be directly multiplexed.

Moreover, a list is exemplarily shown in FIG. 10, where, as other auxiliary information, a flag mem_copmression_flag for deciding whether to apply the compression/decompression technique for each video sequence, the number of compression rates that may be defined for the compressor, the number num_uncompressed_ref_pic of reference pictures in the uncompressed reference picture memory, and/or the number num_uncompressed_ref_pic [ ] of reference pictures in the compressed reference picture memory are multiplexed. Thus, in a case that the compressor having a different compression rate is employed as with the list in FIG. 9, memory allocation can be fixed before starting decoding in the decoding apparatus. Although the number of compression rates is multiplexed in this example, when the coding scheme is different in the compressor, the number of reference pictures may be multiplexed for each compression rate in the coding scheme.

Likewise, assume that the memory compressor 103 and memory decompressor 104 support an MMSQ scheme having a processing cycle of N pixels and a prediction error coded in M bits. The auxiliary information here includes, for example, a flag for deciding whether to apply compression/decompression processing, the cycle N of processing of MMSQ compression, the number M of coding bits for a maximum pixel value within a processing cycle and a minimum pixel value within a processing cycle, and a parameter L of the number of representative values of quantization.

As described above, according to the video coding apparatus in accordance with the fourth embodiment, degradation of image quality of a decoded video can be reduced. A reason thereof is that error accumulation caused by a difference between the reference pictures can be eliminated by making the pixel values of the reference pictures completely equal to each other between the video coding apparatus and video decoding apparatus.

<Fifth Embodiment>

Next, a video decoding apparatus in accordance with the fifth embodiment of the present invention will be described. In the present embodiment, only differences from the first embodiment will be addressed.

Figure 11:
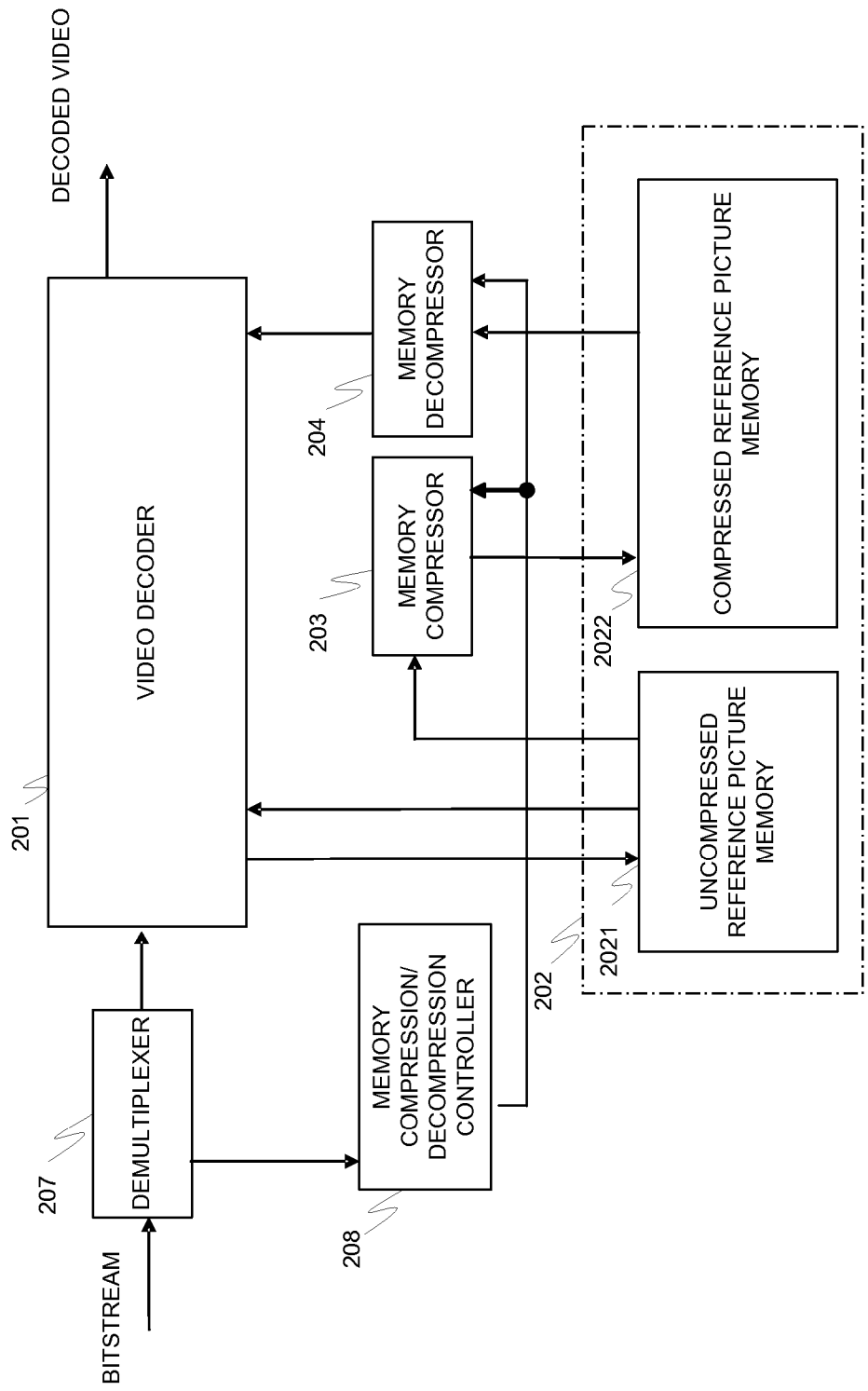
FIG. 11 is a block diagram of a video decoding apparatus in accordance with a fifth embodiment of the present invention.

FIG. 11 is a block diagram of a video decoding apparatus in accordance with a fifth embodiment of the present invention. The video decoding apparatus in accordance with the fifth embodiment additionally comprises a demultiplexer 207, and a memory compression/decompression controller 208.

The demultiplexer 207 demultiplexes a bitstream to extract a video bitstream and auxiliary information required in compression and decompression. The auxiliary information is supplied to the memory compression/decompression controller 208 and the video bitstream to the video decoder 201.

Based on the supplied auxiliary information, the memory compression/decompression controller 208 sets an operation of the memory compressor 203 and memory decompressor 204 so that the same reference picture compression and decompression as those in the video coding apparatus are applied to a reference picture in the video decoding apparatus.

Figure 12:
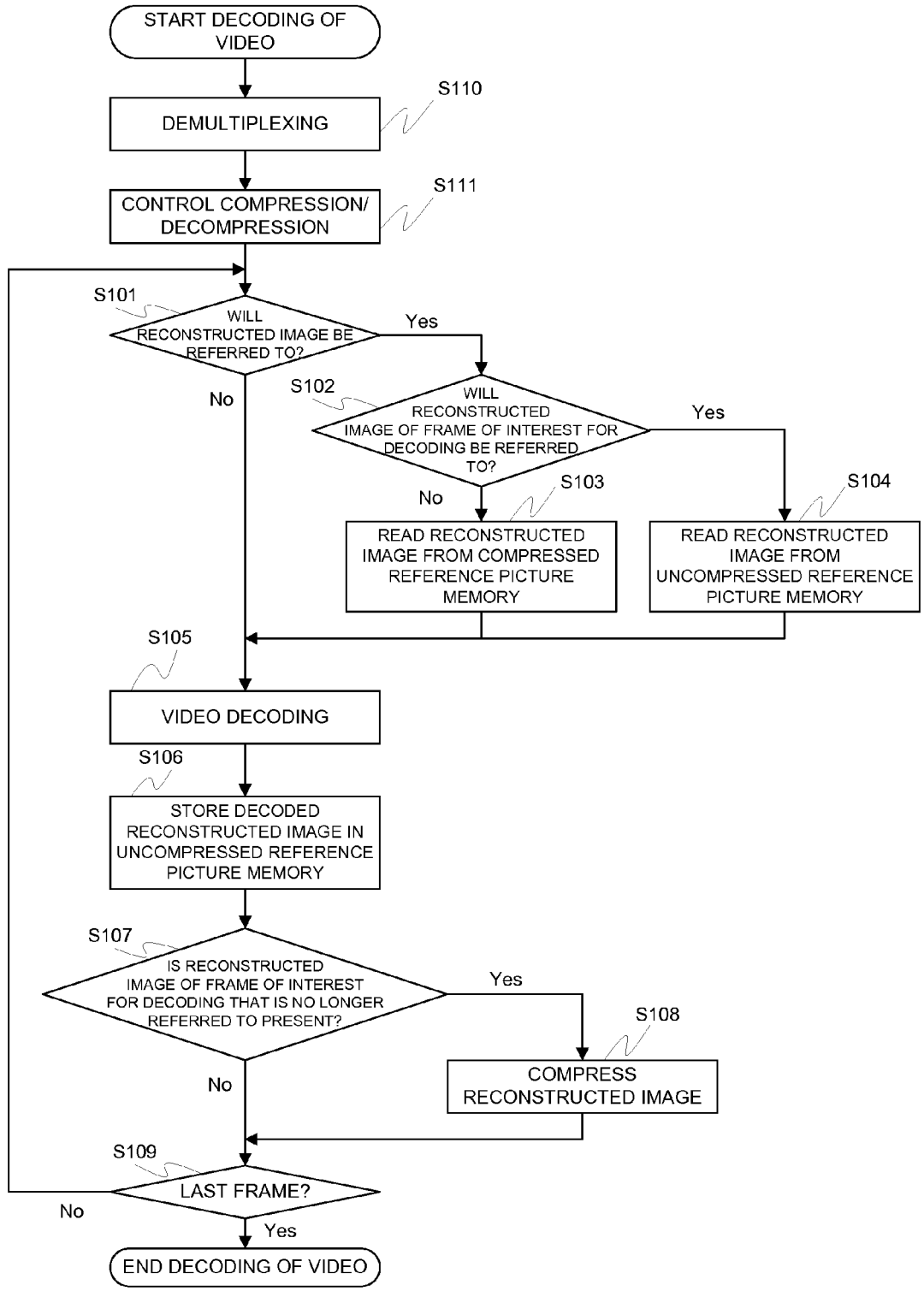
FIG. 12 is a flow chart for explaining video decoding processing by the video decoding apparatus in the fifth embodiment.

Now an operation of the video decoding apparatus in accordance with the fifth embodiment will be described with reference to a flow chart in FIG. 12. Here, memory compression/decompression control and multiplexing of auxiliary information required in compression and decompression are performed only once in coding processing. The processing, however, may be performed on the same unit basis as that in video coding (on a frame-by-frame basis or a several frames-by-frames basis). In contrast to the flow chart in the first embodiment in FIG. 2, Steps S110 and S111 are added. The added steps will be described hereinbelow.

At Step S110, the demultiplexer 207 demultiplexes a bitstream to extract a video bitstream and auxiliary information required in compression and decompression. It then supplies auxiliary information to the memory compression/decompression controller 208 and the video bitstream to the video decoder 201.

At Step S111, based on the supplied auxiliary information, the memory compression/decompression controller 208 sets an operation of the memory compressor 203 and memory decompressor 204 so that the same reference picture compression and decompression as those in the video coding apparatus are applied to a reference picture in the video decoding apparatus.

While the video decoder 201 controls storage of a reference picture in the reference picture memory 202 and/or readout control thereof using information on a decoded video bitstream in this embodiment, the present invention is not limited thereto, and there may be additionally provided therein a reference picture memory controller, for example, for controlling storage of a reference picture in the reference picture memory 202 and/or readout thereof as in the first embodiment. Moreover, the memory compression/decompression controller 208 may make control similar to that by the reference picture memory controller.

As described above, according to the video decoding apparatus in accordance with the fifth embodiment, degradation of image quality of a decoded video can be reduced. A reason thereof is that error accumulation caused by a difference between reference pictures can be eliminated by making the pixel values of the reference pictures completely equal to each other between the video coding apparatus and video decoding apparatus.

While the present invention has been described with reference to the preferred embodiments above, the present invention is not necessarily limited to these embodiments, and may be practiced with various modifications within the scope of the technical concept thereof.

Moreover, the present invention may also be applied to usage in decompressing a bit depth of an input video for reducing the size of the reference picture memory that would otherwise increase with the decompressed bit depth in video coding, as described in, for example, "Improving Video Coding Efficiency by Pixel Bit-depth Increase," Forum of Information Technology 2006, J-009 (2006).

Moreover, while a reconstructed image of a frame of interest for decoding is stored in the uncompressed reference picture memory 2021 without being compressed in the present invention, the present invention is not limited thereto, and a reconstructed image of a reference picture within an AVC-based access unit, for example, may be stored in the uncompressed reference picture memory 2021 without being compressed. Moreover, a reconstructed image in a base layer in AVC scalable coding may be stored in the uncompressed reference picture memory 2021 without being compressed. Furthermore, a reconstructed image in a base view in AVC multi-view coding may be stored in the uncompressed reference picture memory 2021 without being compressed.

The video decoding apparatus and video coding apparatus in accordance with the embodiments of the present invention described above may be implemented by a processor reading an operation program and the like stored in a memory or a recording medium and executing the program, or may be constructed in hardware. Only part of the functions of the embodiments described above may be implemented by a computer program.

Figure 13:
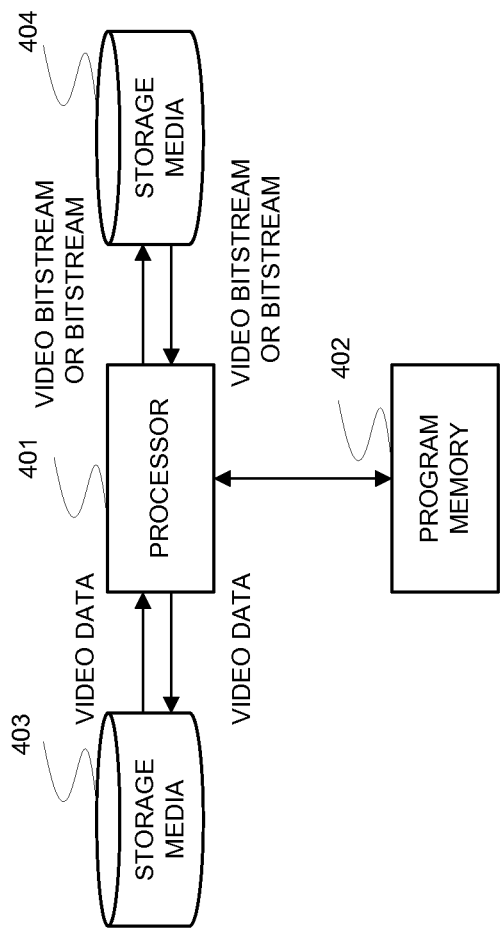
FIG. 13 is a diagram of a configuration of a computer system implementing a video decoding apparatus and a video coding apparatus.
Figure 14:
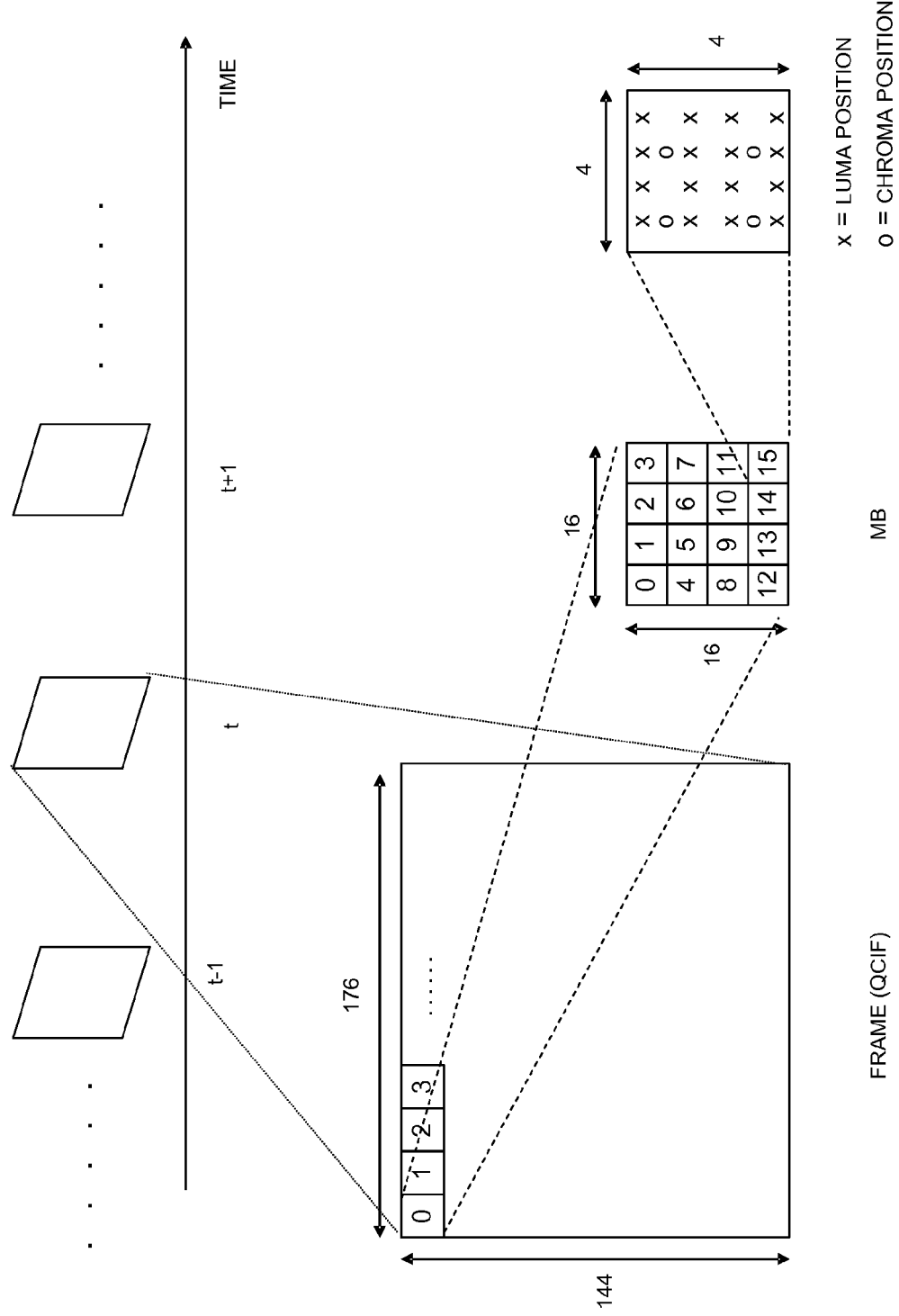
FIG. 14 is a diagram showing an example of division of a frame into blocks.

A configuration diagram of the video decoding apparatus and video coding apparatus in accordance with the present embodiment implemented by an information processing system is exemplarily shown in FIG. 13. The information processing system comprises a processor 401, a program memory 402, and storage media 403 and 404. The processor 401 implements functions of one or both of the video decoding apparatus and video coding apparatus by executing programs stored in the program memory 402. The storage media 403 and 404 may be separate storage media or the same storage medium. The storage media comprise storage media such as a hard disk, a CD-ROM, and the like.

Part or all of the embodiments above may be described as in the following Appendices, although not limited thereto.

(Appendix 1)

A video decoding apparatus for decoding a video bitstream that is coded based on prediction into a video, said apparatus being characterized in comprising:

first and second memories in which reconstructed images for use in prediction are stored;

compressing means for compressing said reconstructed images;

decompressing means for decompressing the compressed reconstructed images; and video decoding means for storing in said first memory a reconstructed image of a frame of interest for decoding generated based on prediction, storing in the second memory a reconstructed image of said reconstructed images stored in said first memory, which is not used in prediction of said frame of interest for decoding, after compressing it via said compressing means, and decoding said video bitstream into a video using the reconstructed image stored in said first memory and the reconstructed image decompressed via said decompressing means.

(Appendix 2)

The video decoding apparatus as recited in Appendix 1, characterized in that when referring to the reconstructed image of a frame of interest for decoding in prediction, said video decoding means reads the reconstructed image stored in said first memory, and when referring to a reconstructed image of a frame other than said frame of interest for decoding in said prediction, it reads said reconstructed image from said second memory and decompresses it via said decompressing means.

(Appendix 3)

The video decoding apparatus as recited in Appendix 1 or 2, characterized in that said video decoding means stores a reconstructed image of a frame of interest for decoding, which may be possibly referred to in prediction, in said first memory.

(Appendix 4)

The video decoding apparatus as recited in any one of Appendices 1 through 3, characterized in that said video decoding means reads the reconstructed image of a frame of interest for decoding, which is no longer referred to, from said first memory, and stores it in said second memory via said compressing means as a compressed data.

(Appendix 5)

The video decoding apparatus as recited in any one of Appendices 1 through 4, characterized in comprising:

receiving means for receiving a bitstream in which a video bitstream is multiplexed with operation parameters regarding control of compression/decompression in coding;

demultiplexing means for demultiplexing said bitstream to extract said video bitstream and said operation parameters; and compression/decompression control means for controlling said compressing means and said decompressing means based on said operation parameters.

(Appendix 6)

A video decoding apparatus for decoding a video bitstream that is coded based on prediction into a video, characterized in comprising:

first and second memories in which reconstructed images for use in prediction are stored;

compressing means for compressing said reconstructed images;

decompressing means for decompressing the compressed reconstructed images; and video decoding means for storing in said first memory a reconstructed image of a frame of interest for decoding generated based on prediction, storing in the second memory the reconstructed image of said frame of interest for decoding after compressing it via said compressing means, and decoding said video bitstream into a video using the reconstructed image stored in said first memory and the reconstructed image decompressed via said decompressing means.

(Appendix 7)

A video decoding apparatus for decoding a video bitstream that is coded based on prediction into a video, characterized in comprising:

first and second memories in which reconstructed images for use in prediction are stored;

first and second compressing means for compressing said reconstructed images;

first decompressing means for decompressing the reconstructed image compressed by said first compressing means;

second decompressing means for decompressing the reconstructed image compressed by said second compressing means; and video decoding means for storing in said first memory a reconstructed image of a frame of interest for decoding generated based on prediction after compressing it via said first compressing means, decompressing a reconstructed image of said reconstructed images stored in said first memory, which is not used in prediction of said frame of interest for decoding, via said first decompressing means, storing in the second memory said decompressed reconstructed image after compressing it via said second compressing means, and decoding said video bitstream into a video using the reconstructed image stored in said first memory after being decompressed and the reconstructed image stored in said second memory after being decompressed.

(Appendix 8)

A video coding apparatus for coding an input video into a video bitstream based on prediction, characterized in comprising:

first and second memories in which reconstructed images for use in prediction are stored;

compressing means for compressing said reconstructed images;

decompressing means for decompressing the compressed reconstructed images;

video coding means for storing in said first memory a reconstructed image of a frame of interest for coding generated based on prediction, storing in the second memory a reconstructed image of said reconstructed images stored in said first memory, which is not used in prediction of said frame of interest for decoding, after compressing it via said compressing means, and coding an input video into a video bitstream using the reconstructed image stored in said first memory and the reconstructed image decompressed via said decompressing means;

compression/decompression control means for controlling said compressing means and said decompressing means; and multiplexing means for multiplexing said video bitstream with operation parameters for said compression/decompression control means, and outputting a bitstream.

(Appendix 9)

The video coding apparatus as recited in Appendix 8, characterized in that when referring to the reconstructed image of a frame of interest for coding in prediction, said video coding means reads the reconstructed image stored in said first memory, and when referring to a reconstructed image of a frame other than said frame of interest for coding in said prediction, it reads said reconstructed image from said second memory and decompresses it via said decompressing means.

(Appendix 10)

The video coding apparatus as recited in Appendix 8 or 9, characterized in that said video coding means stores a reconstructed image of a frame of interest for coding, which may be possibly referred to in prediction, in said first memory.

(Appendix 11)

The video coding apparatus as recited in any one of Appendices 8 through 10, characterized in that:

said video coding means reads a reconstructed image of a frame of interest for coding, which is no longer referred to, from said first memory, and stores it in said second memory via said compressing means as a compressed data.

(Appendix 12)

A video decoding method characterized in comprising:

storing in a first memory reconstructed images of a frame of interest for decoding generated based on prediction;

storing in a second memory a reconstructed image of said reconstructed images stored in said first memory, which is not used in prediction of said frame of interest for decoding, after compressing it; and decoding said video bitstream into a video using the reconstructed image stored in said first memory and the reconstructed image stored in said second memory after being decompressed.

(Appendix 13)

The video decoding method as recited in Appendix 12, characterized in comprising:

when referring to the reconstructed image of a frame of interest for decoding in prediction, reading the reconstructed image stored in said first memory, and;

when referring to a reconstructed image of a frame other than said frame of interest for decoding in said prediction, reading said reconstructed image from said second memory and decompressing it via said decompressing means.

(Appendix 14)

The video decoding method as recited in Appendix 12 or 13, characterized in comprising storing in said first memory a reconstructed image of said frame of interest for decoding, which may be possibly referred to in prediction.

(Appendix 15)

The video decoding method as recited in any one of Appendices 12 through 14, characterized in comprising reading a reconstructed image of a frame of interest for decoding, which is no longer referred to, from said first memory, and storing it in said second memory via said compressing means as a compressed data.

(Appendix 16)

The video decoding method as recited in any one of Appendices 12 through 15, characterized in comprising:

receiving a bitstream in which a video bitstream is multiplexed with operation parameters regarding compression/decompression in coding;

demultiplexing said bitstream to extract said video bitstream and said operation parameters; and controlling compression/decompression of said reconstructed image based on said operation parameters.

(Appendix 17)

A video decoding method characterized in comprising:

storing in a first memory a reconstructed image of a frame of interest for decoding generated based on prediction, and storing in a second memory the reconstructed image of said frame of interest for decoding after compressing it; and decoding said video bitstream into a video using the reconstructed image stored in said first memory and the reconstructed image stored in said second memory after being decompressed.

(Appendix 18)

A video decoding method characterized in comprising:

storing in a first memory reconstructed images of a frame of interest for decoding generated based on prediction after compressing it according to a first compression scheme;

decompressing a reconstructed image of said reconstructed images stored in said first memory, which is not used in prediction of said frame of interest for decoding, and storing it in a second memory after compressing it according to a second compression scheme; and decoding said video bitstream into a video using the reconstructed image stored in said first memory after being decompressed and the reconstructed image stored in said second memory after being decompressed.

(Appendix 19)

A video coding method characterized in comprising:

storing in a first memory reconstructed images of a frame of interest for coding generated based on prediction;

storing in a second memory a reconstructed image of said reconstructed images stored in said first memory, which is not used in prediction of said frame of interest for decoding, after compressing it;

coding an input video into a video bitstream using the reconstructed image stored in said first memory and the reconstructed image stored in said second memory after being decompressed;

controlling compression/decompression of said reconstructed images; and multiplexing said video bitstream with operation parameters regarding control of compression/decompression of said reconstructed images, and outputting a bitstream.

(Appendix 20)

The video coding method as recited in Appendix 19, characterized in comprising:

when referring to the reconstructed image of a frame of interest for coding in prediction, reading the reconstructed image stored in said first memory; and when referring to a reconstructed image of a frame other than said frame of interest for coding in said prediction, reading said reconstructed image from said second memory and decompressing it via said decompressing means.

(Appendix 21)

The video coding method as recited in Appendix 19 or 20, characterized in comprising:

storing in said first memory a reconstructed image of a frame of interest for coding, which may be possibly referred to in prediction.

(Appendix 22)

The video coding method as recited in any one of Appendices 19 through 21, characterized in comprising:

reading a reconstructed image of a frame of interest for coding, which is no longer referred to, from said first memory, and storing it in said second memory after compressing it.

(Appendix 23)

A program causing a computer to execute the processing of:

storing in a first memory reconstructed images of a frame of interest for decoding generated based on prediction;

storing in a second memory a reconstructed image of said reconstructed images stored in said first memory, which is not used in prediction of said frame of interest for decoding, after compressing it; and decoding said video bitstream into a video using the reconstructed image stored in said first memory and the reconstructed image stored in said second memory after being decompressed.

(Appendix 24)

A program causing a computer to execute the processing of:

storing in a first memory a reconstructed image of a frame of interest for decoding generated based on prediction and storing in a second memory the reconstructed image of said frame of interest for decoding after compressing it; and decoding said video bitstream into a video using the reconstructed image stored in said first memory and the reconstructed image stored in said second memory after being decompressed.

(Appendix 25)

A program causing a computer to execute the processing of:

storing in a first memory reconstructed images of a frame of interest for decoding generated based on prediction after compressing it according to a first compression scheme;

decompressing a reconstructed image of said reconstructed images stored in said first memory, which is not used in prediction of said frame of interest for decoding, and storing it in a second memory after compressing it according to a second compression scheme; and decoding said video bitstream into a video using the reconstructed image stored in said first memory after being decompressed and the reconstructed image stored in said second memory after being decompressed.

(Appendix 26)

A program causing a computer to execute the processing of:

storing in a first memory reconstructed images of a frame of interest for coding generated based on prediction;

storing in a second memory a reconstructed image of said reconstructed images stored in said first memory, which is not used in prediction of said frame of interest for decoding, after compressing it;

coding an input video into a video bitstream using the reconstructed image stored in said first memory and the reconstructed image stored in said second memory after being decompressed;

controlling compression/decompression of said reconstructed images; and multiplexing said video bitstream with operation parameters regarding control of compression/decompression of said reconstructed images, and outputting a bitstream.

While the present invention has been explained with reference to several embodiments and exemplary embodiments, the present invention is not limited to these embodiments and exemplary embodiments and may be practiced with various modifications within the scope of technical concept thereof. The present application claims priority based on Japanese Patent Application No. 2010-155601 filed on Jul. 8, 2010, the disclosure of which is incorporated herein in its entirety.

REFERENCE SIGNS LIST

101 Video coder
102 Reference picture memory
1021 Uncompressed reference picture memory
1022 Compressed reference picture memory
103 Memory compressor
104 Memory decompressor
105 Memory compression/decompression controller
106 Multiplexer
201 Video decoder
202 Reference picture memory
2021 Uncompressed reference picture memory
2022 Compressed reference picture memory
203 Memory compressor
204 Memory decompressor
207 Demultiplexer
208 Memory compression/decompression controller
301 Variable-length decoder
302 Scaling/de-quantization/inverse integer conversion unit
303 Adder
304 In-loop filter unit
305 Intra-frame predictor
306 Inter-frame predictor
307 DPCM memory compressor
308 DPCM memory decompressor
401 Processor
402 Program memory
403, 404 Storage medium

The invention claimed is:

1. A video decoding apparatus for decoding a video bitstream that is coded based on prediction into a video, comprising:

first and second memories in which reconstructed images for use in prediction are stored;

a compressor that compresses said reconstructed images;

a decompressor that decompresses the compressed reconstructed images; and a video decoder that stores in said first memory a reconstructed image of a frame of interest for decoding generated based on prediction, stores in the second memory after compression via said compressor a reconstructed image of said reconstructed images stored in said first memory, which is not used in prediction of said frame of interest for decoding, and decodes said video bitstream into said video using the reconstructed image stored in said first memory and the reconstructed image decompressed via said decompressor, wherein the reconstructed image of said frame of interest for decoding, stored in said first memory, is used in intra-prediction of said frame of interest for decoding.

2. The video decoding apparatus according to claim 1, comprising:
a receiver that receives a bitstream in which a video bitstream is multiplexed with operation parameters regarding control of compression/decompression in coding;
a demultiplexer that demultiplexes said bitstream to extract said video bitstream and said operation parameters; and
compression/decompression controller that controls said compressor and said decompressor based on said operation parameters.

3. The video decoding apparatus according to claim 1, wherein said video decoder reads the reconstructed image stored in said first memory when referring to the reconstructed image of a frame of interest for decoding in prediction, and reads said reconstructed image from said second memory and decompresses it via said decompressor when referring to a reconstructed image of a frame other than said frame of interest for decoding in said prediction.

4. The video decoding apparatus according to claim 1, wherein said video decoder reads the reconstructed image of a frame of interest for decoding, which is no longer referred to, from said first memory, and stores it in said second memory via said compressor as a compressed data.

5. A video decoding apparatus for decoding a video bitstream that is coded based on prediction into a video, comprising:
first and second memories in which reconstructed images for use in prediction are stored;
a compressor that compresses said reconstructed images;
a decompressor that decompresses the compressed reconstructed images; and
a video decoder that stores in said first memory a reconstructed image of a frame of interest for decoding generated based on prediction, stores in the second memory after compression via said compressor said reconstructed image of the frame of interest for decoding, and decodes said video bitstream into said video using the reconstructed image stored in said first memory and the reconstructed image decompressed via said decompressor,
wherein the reconstructed image of said frame of interest for decoding, stored in said first memory, is used in intra-prediction of said frame of interest for decoding.

6. A video decoding apparatus for decoding a video bitstream that is coded based on prediction into a video, comprising:
first and second memories in which reconstructed images for use in prediction are stored;
a first and second compressor that compresses said reconstructed images;
a first decompressor that decompresses the reconstructed image compressed by said first compressor;

a second decompressor that decompresses the reconstructed image compressed by said second compressor; and
a video decoder that stores in said first memory a reconstructed image of a frame of interest for decoding generated based on prediction after compressing it via said first compressor, decompresses a reconstructed image of said reconstructed images stored in said first memory, which is not used in prediction of said frame of interest for decoding, via said first decompressor, stores in the second memory after compression via said second compressor said decompressed reconstructed image, and decodes said video bitstream into said video using the reconstructed image stored in said first memory after being decompressed and the reconstructed image stored in said second memory after being decompressed,
wherein the reconstructed image of said frame of interest for decoding, stored in said first memory, is used in intra-prediction of said frame of interest for decoding.

7. A video coding apparatus for coding an input video into a video bitstream based on prediction, comprising:
first and second memories in which reconstructed images for use in prediction are stored;
a compressor for compressing said reconstructed images;
a decompressor that decompresses the compressed reconstructed images;
a video coder that stores in said first memory a reconstructed image of a frame of interest for coding generated based on prediction, stores in the second memory after compression via said compressor a reconstructed image of said reconstructed images stored in said first memory, which is not used in prediction of said frame of interest for coding, and codes an input video into said video bitstream using the reconstructed image stored in said first memory and the reconstructed image decompressed via said decompressor;
a compression/decompression controller that controls said compressor and said decompressor; and
a multiplexer that multiplexes said video bitstream with operation parameters for said compression/decompression controller, and outputs a bitstream,
wherein the reconstructed image of said frame of interest for coding, stored in said first memory, is used in intra-prediction of said frame of interest for coding.

8. The video coding apparatus according to claim 7, wherein said video coder reads the reconstructed image stored in said first memory when referring to the reconstructed image of a frame of interest for coding in prediction, and reads said reconstructed image from said second memory and decompresses it via said decompressor.

9. The video coding apparatus according to claim 7, wherein said video coder reads a reconstructed image of a frame of interest for coding, which is no longer referred to, from said first memory, and stores it in said second memory via said compressor as a compressed data.

10. A video decoding method comprising:
storing in a first memory reconstructed images of a frame of interest for decoding generated based on prediction;
storing in a second memory, after compression, a reconstructed image of said reconstructed images stored in said first memory, which is not used in prediction of said frame of interest for decoding; and
decoding said video bitstream into a video using the reconstructed image stored in said first memory and the reconstructed image stored in said second memory after being decompressed, wherein the reconstructed image of said frame of interest for decoding, stored in said first memory, is used intra-prediction of said frame of interest for decoding.

11. The video decoding method according to claim 10, further comprising reading the reconstructed image stored in said first memory when referring to the reconstructed image of a frame of interest for decoding in prediction, and reading said reconstructed image from said second memory and decompressing it when referring to a reconstructed image of a frame other than said frame of interest for decoding in said prediction.

12. The video decoding method according to claim 10 further comprising reading a reconstructed image of a frame of interest for decoding, which is no longer referred to, from said first memory, and storing it in said second memory as a compressed data.

13. The video decoding method according to claim 10, further comprising:
receiving a bitstream in which a video bitstream is multiplexed with operation parameters regarding compression/decompression in coding;
demultiplexing said bitstream to extract said video bitstream and said operation parameters; and
controlling compression/decompression of said reconstructed image based on said operation parameters.

14. A video coding method comprising:
storing in a first memory reconstructed images of a frame of interest for coding generated based on prediction;
storing in a second memory, after compression, a reconstructed image of said reconstructed images stored in said first memory, which is not used in prediction of said frame of interest for coding;
coding an input video into a video bitstream using the reconstructed image stored in said first memory and the reconstructed image stored in said second memory after being decompressed;
controlling compression/decompression of said reconstructed images; and
multiplexing said video bitstream with operation parameters regarding control of compression/decompression of said reconstructed images, and outputting a bitstream,
wherein the reconstructed image of said frame of interest for coding, stored in said first memory, is used intra-prediction of said frame of interest for coding.

15. A non-transitory computer readable storage medium storing a program causing a computer to execute the processing of:
storing in a first memory reconstructed images of a frame of interest for decoding generated based on prediction;
storing in a second memory, after compression, a reconstructed image of said reconstructed images stored in said first memory, which is not used in prediction of said frame of interest for decoding; and
decoding said video bitstream into a video using the reconstructed image stored in said first memory and the reconstructed image stored in said second memory after being decompressed,
wherein the reconstructed image of said frame of interest for decoding, stored in said first memory, is used intra-prediction of said frame of interest for decoding.

16. A non-transitory computer readable storage medium storing a program causing a computer to execute the processing of:
storing in a first memory reconstructed images of a frame of interest for coding generated based on prediction;
storing in a second memory, after compression, a reconstructed image of said reconstructed images stored in said first memory, which is not used in prediction of said frame of interest for coding;
coding an input video into a video bitstream using the reconstructed image stored in said first memory and the reconstructed image stored in said second memory after being decompressed;
controlling compression/decompression of said reconstructed images; and
multiplexing said video bitstream with operation parameters regarding control of compression/decompression of said reconstructed images, and outputting a bitstream,
wherein the reconstructed image of said frame of interest for coding, stored in said first memory, is used intra-prediction of said frame of interest for coding.

* * * * *